July 9, 1940.                    G. N. HERRING                    2,207,059
                              TRAILER COUPLING EYE
                              Filed Aug. 28, 1939
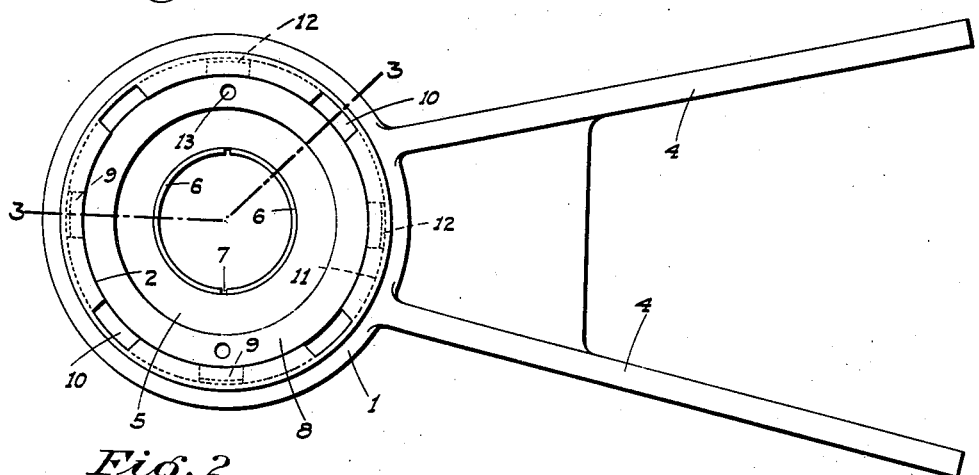
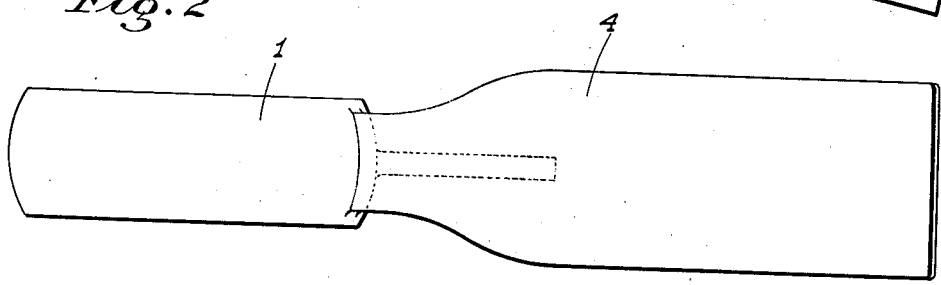
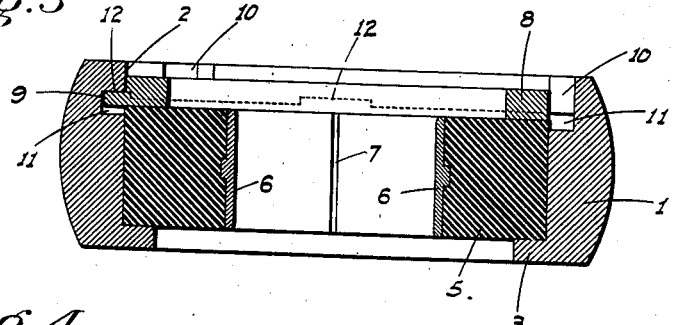
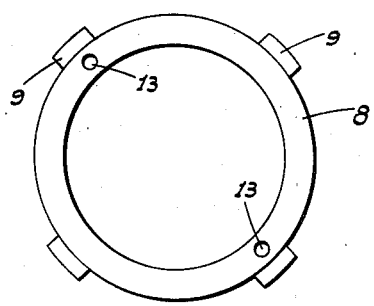
INVENTOR.
Glenn N. Herring
BY
ATTORNEY Patented July 9, 1940

2,207,059

UNITED STATES PATENT OFFICE 2,207,059

TRAILER COUPLING EYE

Glenn N. Herring, Fresno, Calif., assignor of one-half to William W. Cockrill, Fresno, Calif.

Application August 28, 1939, Serial No. 292,203

2 Claims. (Cl. 280—33.9)

This invention relates to couplings for commercial or heavy duty trailers such as are used for freight carrying on the highways and which are connected to power trucks.

Principal objects of my invention are to provide a coupling device including a coupling eye adapted for connection to a trailer tongue and to cooperate with the coupling hook on the truck, so constructed that wear and crystallization of the metal parts are practically eliminated; shimmeying or lateral swaying of the front end of the trailer is avoided; loose play between the coupling parts is eliminated so that shocks to the vehicles or to the driver of the truck are likewise reduced to a minimum; and compensation is automatically had for any slight variation in hook diameter from the normal standard size.

Further objects are to provide a device for the purpose in which there is but one replaceable part, and a retaining means therefor arranged so that said part can be easily and quickly replaced, and which is held against accidental displacement either from jars, shocks or other reasons; a device which is simple, strong, and fool proof, and which will last indefinitely; and a device which may be connected to a standard trailer tongue and a standard truck coupling hook without change to either member.

These objects I accomplish by means of such structure and relative arrangement of parts as will fully appear by a perusal of the following specification and claims.

In the drawing similar characters of reference indicate corresponding parts in the several views:

Figure 1 is a top plan view of the device as detached.

Figure 2 is a side elevation of the same.

Figure 3 is an enlarged sectional elevation on line 3—3 of Fig. 1.

Figure 4 is a plan view of the retaining ring detached.

Referring now more particularly to the characters of reference on the drawing, the device comprises a metal eye 1 having a circular bore 2 and a bottom relatively shallow annular flange 3 projecting radially in from the bore. Diverging arms 4 are secured to the eye and are rigid therewith to straddle the outer end of a standard trailer tongue; the annular divergence being the same as that of the sides of the tongue so as to have a proper fit therewith. Since the eye is intended to be permanently installed on the tongue it may be secured thereto by welding.

A thick resilient rubber ring 5 is removably disposed in the bore 2 and seats on the flange 3; the ring being lined with bronze bushing sections 6 secured therein and split as at 7 on a a line diametrally of the eye at right angles to the line of pull or draught. The diameter of the bore of the bushings which engage the coupling hook in holding relation is initially such as to snugly engage a hook of the smallest size variation apt to be encountered.

The ring 3 is removably held in place by a relatively thin metal retaining ring 8 fitting in the bore 2 and whose bore is considerably greater than that of the ring. The ring 8 is formed with outwardly projecting lugs 9 at evenly spaced intervals thereabout. These lugs are adapted to register with correspondingly spaced slots 10 cut down from the top of the eye about the bore 2 and communicating with an annular groove 11 in the eye, and having a depth and width sufficient to receive the lugs without binding. Between the slots, notches 12 of a size to receive the lugs and correspondingly spaced slots are cut upwardly from the groove 11. The depth of the resilient ring is such that when it is uncompressed and is seated on the flange 3, its upper face is considerably above the bottom of groove 11 but below the top of the eye.

By reason of this feature of construction it is necessary to compress the rubber ring by a downward pressure on the retaining ring when the latter is initially engaged with the ring 3 and the lugs 9 are in the slots 10 in order that the lugs may aline with the groove 11 and enable the retaining ring to be then rotated until the lugs register with the notches 12. As soon as the lugs thus register, release of the downward pressure on the retaining ring causes the resilient rubber to exert an upward pressure on said retaining ring thus locating and holding the lugs against retractive rotation unless the ring is again definitely depressed against the resiliency of the rubber. Once the retaining ring is locked in place, therefore, it is impossible for the rubber ring to be removed or displaced by any jarring or other motions.

The retaining ring is provided with opposed sockets 13 for the reception of the lugs of a spanner so as to provide convenient rotation of the ring.

When placing the hook engaging ring 3 in the eye, it is only necessary to see that the split line of the bushing sections is disposed at right angles to the line of pull as above recited. When the hook is engaged with the bushing and is pulling forward, the rubber between the front bushing section and the front portion of the eye will yield so that a cushioning and shock absorbing action between the eye and hook is had. Also, there being no metal to metal contact at any time, there is no wear on the hook or eye and which with present construction calls for replacing or building up of the worn surfaces at frequent intervals. Also, since such metal to metal contact is avoided, crystallization of the metal with resultant breakage is eliminated.

Further, a hook may thus be snugly engaged with the bushing sections regardless of any variation in size above the minimum and which is sometimes encountered due to the generally rough and unfinished nature of the hooks.

The rubber ring will last a considerable time in service without deteriorating or losing its resiliency, and when it is necessary to replace the same this can be easily and quickly done without removing the eye from connection with the tongue, and at a minimum of expense.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In the combination of a trailer coupling eye member having a bore of substantial length, a resilient rubber ring disposed in the bore, means on the eye member at one end of the bore to support the ring at one end, the opposite end of said rubber ring then being short of the adjacent end of the bore, and a rigid retaining ring disposed in the bore and compressively engaging said rubber ring at said opposite end; lugs projecting radially from the retaining ring, the eye member being formed adjacent the corresponding end of the bore with an annular groove thereabout and having slots to register with said lugs cut down from said end and communicating with the groove, and means in said groove between the slots to releasably engage and prevent movement of the lugs in the groove upon said retaining ring being urged outward by the expansive force of the rubber ring.

2. In the combination of a trailer coupling eye member having a bore of substantial length, a resilient rubber ring disposed in the bore, means on the eye member at one end of the bore to support the ring at one end, the opposite end of said rubber ring then being short of the adjacent end of the bore, and a rigid retaining ring disposed in the bore and compressingly engaging said rubber ring at said opposite end; lugs projecting radially from the retaining ring, the eye member being formed adjacent the corresponding end of the bore with an annular groove thereabout and having slots to register with said lugs cut down from said end and communicating with the groove, and notches to receive said lugs cut toward said end from the adjacent faces of said groove between the slots.

GLENN N. HERRING.